United States Patent
Goto et al.

(10) Patent No.: US 10,331,249 B2
(45) Date of Patent: Jun. 25, 2019

(54) TOUCH SENSOR SUBSTRATE, TOUCH PANEL, DISPLAY DEVICE, AND METHOD FOR PRODUCING TOUCH SENSOR SUBSTRATE

(71) Applicant: VTS-TOUCHSENSOR CO., LTD., Higashiomi-shi (JP)

(72) Inventors: Hiroki Goto, Taito-ku (JP); Maki Tanaka, Taito-ku (JP); Gen Nakamura, Taito-ku (JP)

(73) Assignee: VTS-TOUCHSENSOR CO., LTD., Higashiomi-shi (JP)

( * ) Notice: Subject to any disclaimer, the term of this patent is extended or adjusted under 35 U.S.C. 154(b) by 49 days.

(21) Appl. No.: 15/388,639

(22) Filed: Dec. 22, 2016

(65) Prior Publication Data

US 2017/0102808 A1 Apr. 13, 2017

Related U.S. Application Data

(63) Continuation of application No. PCT/JP2015/068081, filed on Jun. 23, 2015.

(30) Foreign Application Priority Data

Jun. 24, 2014 (JP) ................................ 2014-129039
Oct. 30, 2014 (JP) ................................ 2014-221390

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G02F 1/13439* (2013.01);
(Continued)

(58) Field of Classification Search
None
See application file for complete search history.

(56) References Cited

U.S. PATENT DOCUMENTS

2005/0195488 A1* 9/2005 McCabe ................ B60R 1/088
359/603
2008/0129189 A1* 6/2008 Cok ........................ B82Y 20/00
313/503

(Continued)

FOREIGN PATENT DOCUMENTS

CN 101129096 A 2/2008
CN 101982031 A 2/2011
(Continued)

OTHER PUBLICATIONS

International Search Report dated Sep. 8, 2015 in PCT/JP2015/068081, filed Jun. 23, 2015.
(Continued)

*Primary Examiner* — Kenneth B Lee, Jr.
(74) *Attorney, Agent, or Firm* — Oblon, McClelland, Maier & Neustadt, L.L.P.

(57) ABSTRACT

A touch sensor substrate including a base material having a first surface, and electrodes each having a bottom surface positioned on the first surface, a top surface opposite to the bottom surface, and side surfaces connecting the bottom and top surfaces, each of the electrodes having a blackened layer formed on the side surfaces and at least one of the bottom and top surfaces. The blackened layer has a surface resistivity of less than 1 Ω/square.

24 Claims, 8 Drawing Sheets

(51) Int. Cl.
*G02F 1/1333* (2006.01)
*G02F 1/1335* (2006.01)
*G02F 1/1343* (2006.01)

(52) U.S. Cl.
CPC .. *G02F 1/133502* (2013.01); *G02F 1/134309* (2013.01); *G06F 3/044* (2013.01); *G06F 2203/04103* (2013.01)

(56) References Cited

U.S. PATENT DOCUMENTS

2014/0017508 A1   1/2014  Lee et al.
2015/0177876 A1*  6/2015  Ishii .................. G06F 3/044
                                                    345/174

FOREIGN PATENT DOCUMENTS

| CN | 102804108 A   | 11/2012 |
| CN | 103677396 A   | 3/2014  |
| JP | 2000-12388    | 1/2000  |
| JP | 4610416 B     | 10/2010 |
| JP | 2013-129183 A | 7/2013  |
| JP | 2013-235315 A | 11/2013 |
| JP | 2014-016944 A | 1/2014  |
| JP | 2014-019947 A | 2/2014  |
| JP | 2015-82178 A  | 4/2015  |
| JP | 2015-125605 A | 7/2015  |
| TW | 201 224 903 A | 6/2012  |
| TW | 201 406 225 A | 2/2014  |
| TW | 201 422 090 A | 6/2014  |
| TW | 201 423 771 A | 6/2014  |

OTHER PUBLICATIONS

Office Action dated Jan. 28, 2019, in Taiwan Patent Application No. 104 120 084 with English-language translation. (14 pgs.).
Office Action dated Apr. 2, 2019, in Chinese Patent Application No. 201580034020.3, (5 pages).

* cited by examiner

TOUCH SENSOR SUBSTRATE, TOUCH PANEL, DISPLAY DEVICE, AND METHOD FOR PRODUCING TOUCH SENSOR SUBSTRATE

CROSS-REFERENCE TO RELATED APPLICATIONS

The present application is a continuation of International Application No. PCT/JP2015/068081, filed Jun. 23, 2015, which is based upon and claims the benefits of priority to Japanese Application No. 2014-129039, filed Jun. 24, 2014 and Japanese Application No. 2014-221390, filed Oct. 30, 2014. The entire contents of all of the above applications are incorporated herein by reference.

BACKGROUND OF THE INVENTION

Field of the Invention

The present invention relates to a touch sensor substrate provided with an electrode, a touch panel, a display device, and a method of producing a touch sensor substrate.

Discussion of the Background

In recent years, touch sensors are applied to operation units of various electronic devices, including mobile phones, mobile information terminals, ATMs, and car navigation systems. Such a touch sensor is bonded onto a display surface of an image display panel, such as a liquid crystal display device, as an input device for detecting a contact position of a fingertip or a pen point. Touch sensors are categorized into various types, such as resistive film type, capacitive type, optical type, and ultrasonic type, based on the structure and detection method of the touch sensors and are used with electronic devices depending on the applications. Among these types, from the perspective of having good durability, transmittance, sensitivity, stability, and position resolution, capacitive touch sensors, in which the electrodes do not contact with each other, are in mainstream use.

Capacitive touch sensors are categorized into a surface type and projection type. Both types use techniques of capacitive coupling. Capacitive coupling is caused by approach of an object having electrostatic conductivity, such as a finger, to the surface of such a touch sensor. The capacitive coupling between the electrode and the fingertip is captured by the touch sensor, for detection of the position (e.g., refer to PTL 1).

The surface type touch sensor includes a transparent conductive film planarly extending over a transparent substrate as a position detection electrode, and electrodes which are positioned at the four corners of the conductive film and connected to a driving circuit.

The projection type touch sensor includes a plurality of sensor-use conductive films extending in an X direction, which can be any direction, and a plurality of first conductive films extending in a Y direction, which is perpendicular to the X direction, as electrodes to be used for position detection. Such a position detection electrode is, for example, a mesh in plan view and exerts higher position detection accuracy as the arrangement pitch of the sensor-use conductive films and the first conductive films becomes smaller.

On the other hand, touch sensors described above are often installed on display surfaces of image display panels, and thus light transmission is required for either type of touch sensors. From the perspective of light transmission, the material for forming the position detection electrode is preferably a transparent conductive material having high transparency, such as ITO and ZnO, for example. However, with the upsizing of such touch sensors, an electrode formed from a transparent conductive material will have a greater length, and as a result, the electrode will have a higher resistance and the sensitivity for position detection will be lower. In recent years, it has been proposed to use metal having high conductivity which is capable of blocking light, as a material for forming the position detection electrode, with a thin wire shape to increase aperture ratio of the touch sensor.

A connection terminal that is an end of the electrode is bonded to a connection terminal portion of a flexible substrate to which a driving semiconductor device is mounted via an ACF (anisotropic conductive film). In this case, if the material for forming the electrode is a transparent conductive material, such as ITO, the connection terminal connected to the electrode is usually made of or covered with metal to decrease the contact resistance. In this regard, when the electrode is designed to be made of metal, the electrode and the connection terminal can be formed concurrently.

When electrodes are made of light-shielding metal and the plurality of electrodes are in a mesh shape in plan view, for example, the electrodes need to have a wire width which is so small, e.g. 10 µm or less, that they are not visually recognized. In addition, to minimize visibility of the thin wire electrodes, the reflective luster characteristic of metals has to be suppressed (e.g., refer to PTLs 2 to 4).

PTL 1: JP-B-4610416
PTL 2: JP 2014-016944
PTL 3: JP 2014-019947
PTL 4: JP 2013-129183

SUMMARY OF THE INVENTION

According to one aspect of the present invention, a touch sensor substrate includes a base material having a first surface, and electrodes each having a bottom surface positioned on the first surface, a top surface opposite to the bottom surface, and side surfaces connecting the bottom and top surfaces, each of the electrodes having a blackened layer formed on the side surfaces and at least one of the bottom and top surfaces. The blackened layer has a surface resistivity of less than 1 $\Omega$/square.

According to another aspect of the present invention, a method of producing a touch sensor substrate includes forming electrode patterns on a first surface of a base material such that each of the electrodes has a bottom surface positioned on the first surface, a top surface opposite to the bottom surface, and side surfaces connecting the bottom and top surfaces, and applying a blackening treatment to each of the electrode patterns such that a blackened layer is formed on the side surfaces and at least one of the top and bottom surfaces. The blackening treatment is a black sulfide treatment or a black substitution treatment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
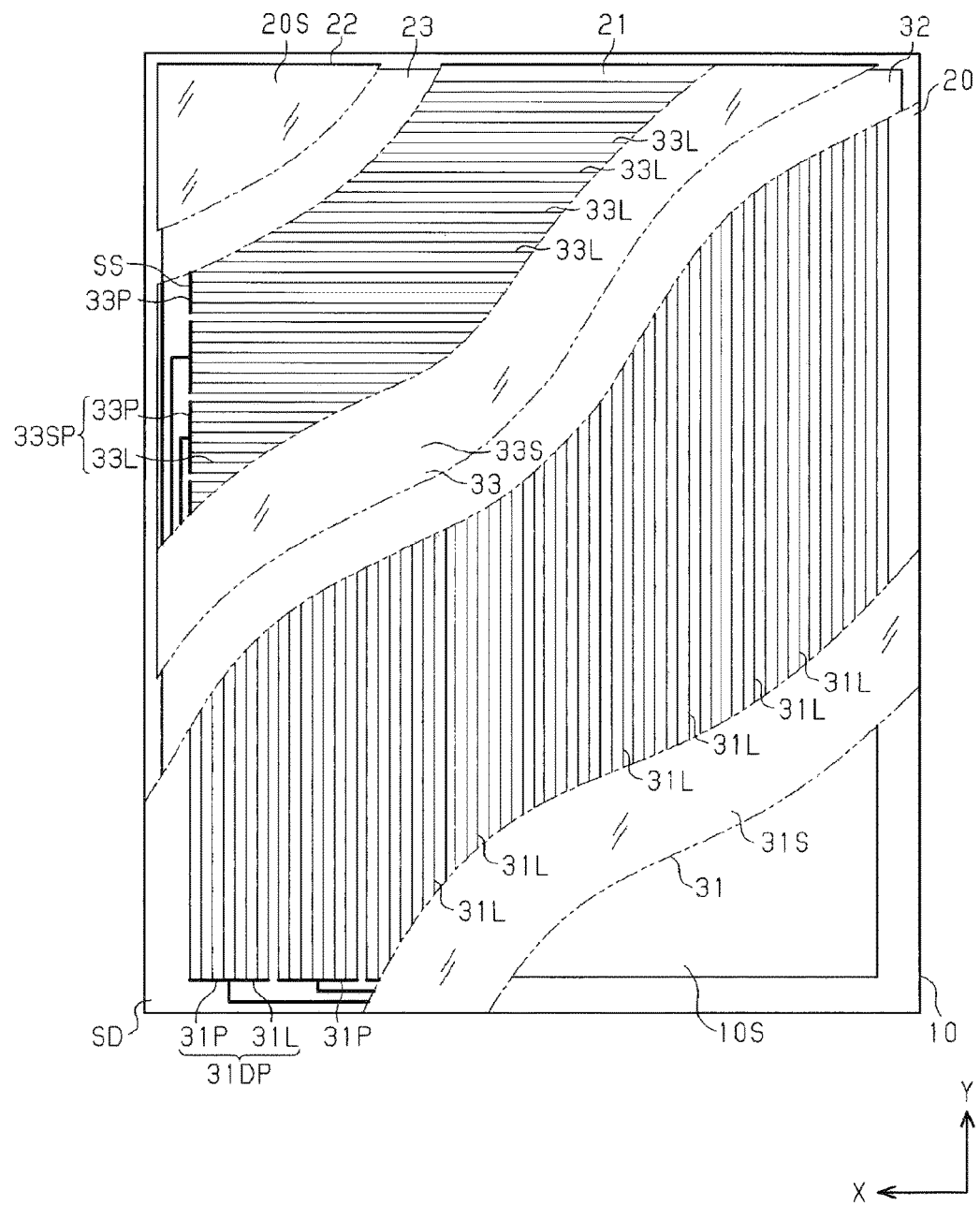
FIG. 1 is a plan view illustrating an example of a planar structure of a display device according to an embodiment.

The embodiments will now be described with reference to the accompanying drawings, wherein like reference numerals designate corresponding or identical elements throughout the various drawings.

With reference to FIGS. 1 to 13, an embodiment of a touch sensor substrate, a touch panel, a display device, and a method of producing a touch sensor substrate will be described.

Planar Structure of Display Device

Referring to FIG. 1, a structure of a display device will be described. In FIG. 1, for convenience of illustrating the structures of first electrodes and second electrodes included in the display device, a plurality of first electrodes configuring an electrode group and a plurality of second electrodes configuring an electrode group are exaggerated. Also, first electrode wires as an example of electrodes configuring the first electrodes and second electrode wires as an example of electrodes configuring the second electrodes are schematically illustrated.

As shown in FIG. 1, the display device is a laminate in which a display panel 10 as a liquid crystal panel, and a sensor base 20, for example, are bonded via a transparent adhesive layer, with a driving circuit for driving the sensor base 20 being provided. The display panel 10 has a surface where a display surface 10S is defined. The display surface 10S displays information, such as an image, based on external image data. On the precondition that relative positions of the display panel 10 and the sensor base 20 are fixed by another structure, such as a housing, the transparent adhesive layer may be omitted.

The sensor base 20 configures a capacitive touch panel. The sensor base 20 is a laminate in which an electrode substrate 21 and a cover layer 22 are bonded via a transparent adhesive layer 23, with light transmission properties being imparted to transmit the information displayed by the display panel 10. The cover layer 22 is formed of a glass substrate, a resin film, or the like, and has a surface opposite to the surface bonded to the transparent adhesive layer 23 to serve as a front surface of the sensor base 20 and as an operation surface 20S of the sensor base 20. The transparent adhesive layer 23 has light transmission properties to transmit an image displayed on the display surface 10S. For the transparent adhesive layer 23, a polyether adhesive or an acrylic adhesive, for example, is used.

The electrode substrate 21 includes components which are a transparent support substrate 31, first electrodes 31DP, a transparent adhesive layer 32, a transparent dielectric substrate 33, and second electrodes 33SP, arranged in order receding from the display panel 10.

The transparent support substrate 31 configuring the electrode substrate 21 is laid over the entire display surface 10S formed in the display panel 10, being imparted with light transmission properties to transmit the information, such as an image, to be displayed by the display surface 10S. The transparent support substrate 31 is configured by a base material, such as a transparent glass substrate or a transparent resin film, and may have a single layer structure formed of a single substrate or may have a multilayer structure in which two or more substrates are layered.

A surface of the transparent support substrate 31 opposite to the surface facing the display panel 10 is designed as a first electrode arrangement surface 31S where the first electrodes 31DP are formed. The first electrode arrangement surface 31S of the transparent support substrate 31 is an example of the first surface. In the first electrode arrangement surface 31S, the plurality of first electrodes 31DP each have a strip shape extending in a Y direction, which can be any direction, and are arrayed at intervals in an X direction perpendicular to the Y direction. The transparent support substrate 31 as an example of the base material may be formed of a transparent base material and an adhesive layer, and the first electrode arrangement surface 31S may be a surface of the adhesive layer to which the first electrodes 31DP are adhered. The transparent support substrate 31 and the first electrodes 31DP configure one touch sensor substrate.

Each of the plurality of first electrodes 31DP is a set of a plurality of first electrode wires 31L, and each of the plurality of first electrode wires 31L has a linear shape extending in a direction. Each of the plurality of first electrodes 31DP is individually connected to a selection circuit via a first pad 31P and selected by the selection circuit by receiving a driving signal outputted from the selection circuit.

Materials that can be used for forming the first electrodes 31DP include nano wires of copper, aluminum, or silver which are metals with low resistance, and copper is desirably used. In the case where the material for forming the first electrodes 31DP is a transparent conductive material, such as ITO, the first electrode wires 31L may have a large wire width, as long as the resistance of the first electrode wires 31L is within a predetermined range. In contrast, in the case where the material for forming the first electrodes 31DP is a material having light-shielding properties, such as a metal, it is preferable that the wire width and the number of first electrode wires 31L are smaller comparing with those of the configuration using a transparent conductive material as the material for forming the first electrode wires 31L, in order to increase transmittance of the first electrodes 31DP. A gap between the first electrode wires 31L adjacent to each other is appropriately designed to obtain a desired position resolution.

In the first electrode arrangement surface 31S, a connection area SD located outside the plurality of first electrodes 31DP serves as an area for forming wirings, terminals, and the like. These wirings and terminals connect the first electrodes 31DP to connection terminals of a flexible substrate to which driving semiconductors are mounted. If the material for forming the first electrodes 31DP is a transparent conductive material, such as ITO, wirings and terminals in the connection area SD are formed, in many cases, of metal or combined with metal portions from the perspective of achieving intimate contact with the connection terminals. Thus, the configuration of the first electrodes 31DP described above enables formation of wirings and terminals in the connection area SD concurrently with the formation of the first electrodes 31DP. In this way, the configuration provides an advantage of simplifying the production process, comparing with a method of forming a pattern in the connection area SD separately from the first electrodes 31DP.

The plurality of first electrodes 31DP and an area where the first electrodes 31DP are not located in the first electrode arrangement surface 31S are bonded to the transparent dielectric substrate 33 by the transparent adhesive layer 32. The transparent adhesive layer 32 has light transmission properties to transmit information, such as an image, displayed on the display surface 10S, and adheres the first electrode arrangement surface 31S and the plurality of first electrodes 31DP to the transparent dielectric substrate 33. For the transparent adhesive layer 32, a polyether adhesive, an acrylic adhesive, or the like is used. The transparent dielectric substrate 33 has a back surface where the plurality of first electrodes 31DP are arrayed, the back surface corresponding to a surface facing the transparent support substrate 31.

The transparent dielectric substrate 33 is formed of a base material, such as a transparent resin film of polyethylene terephthalate or the like, or a transparent glass substrate, and may have a single layer structure formed of one base material or may have a multilayer structure in which two or more base materials are layered. The transparent dielectric substrate 33 has light transmission properties to transmit information, such as an image, displayed on the display surface 10S, and a relative dielectric constant suitable for detecting the capacitance between the electrodes.

The front surface of the transparent dielectric substrate 33, as a surface on a side opposite to the transparent adhesive layer 32, is designed as a second electrode arrangement surface 33S where the second electrodes 33SP are formed. The second electrode arrangement surface 33S of the transparent dielectric substrate 33 is an example of the first surface. In the second electrode arrangement surface 33S, the plurality of second electrodes 33SP each have a band shape extending in the X direction and are arrayed in the Y direction perpendicular to the X direction with a gap therebetween. The transparent dielectric substrate 33 as an example of the base material may be formed of a transparent base material and an adhesive layer, and the second electrode arrangement surface 33S may be a surface of the adhesive layer to which the second electrodes 33SP are adhered. The transparent dielectric substrate 33 and the second electrodes 33SP configure a touch sensor substrate.

Each of the plurality of second electrodes 33SP is a set of a plurality of second electrode wires, and each of a plurality of second electrode wires 33L has a linear shape extending in a direction perpendicular to the first electrode wires 31L. Each of the plurality of second electrodes 33SP is individually connected to a detection circuit via a second pad 33P and current is measured by the detection circuit.

Materials that can be used for forming the second electrodes 33SP include nano wires of copper, aluminum, or silver which are metals with low resistance, and copper is desirably used. When the material for forming the second electrodes 33SP is a transparent conductive material, such as ITO, the second electrode wires 33L may have a large wire width, as long as the resistance of the second electrode wires 33L is within a predetermined range. In contrast, when the material for forming the second electrodes 33SP is a material having light-shielding properties, such as metal, it is preferable that the wire width and the number of second electrode wires 33L are smaller comparing with those of the configuration using a transparent conductive material as the material for forming the second electrode wires 33L, in order to increase transmittance of the second electrodes 33SP. A gap between the second electrode wires 33L adjacent to each other is appropriately designed to obtain desired position resolution.

In the second electrode arrangement surface 33S, a connection area SS located outside the plurality of second electrodes 33SP serves as an area where wirings, terminals, and the like are formed. These wirings and terminals connect the second electrodes 33SP to connection terminals of a flexible substrate to which driving semiconductors are mounted. If the material for forming the second electrodes 33SP is a transparent conductive material, such as ITO, wirings and terminals in the connection area SS are formed, in many cases, of metal or combined with metal portions from the perspective of achieving intimate contact with the connection terminals. Thus, the configuration of the second electrodes 33SP described above enables formation of wirings and terminals in the connection area SS concurrently with the formation of the second electrodes 33SP. In this way, the configuration provides an advantage of simplifying the production process, comparing with a method of forming a pattern in the connection area SS separately from the second electrodes 33SP.

In plan view of the second electrode arrangement surface 33S, the plurality of first electrodes 31DP three dimensionally intersect the plurality of second electrodes 33SP. Accordingly, in plan view of the second electrode arrangement surface 33S, the plurality of first electrode wires 31L in the respective plurality of first electrodes 31DP and the plurality of second electrode wires 33L in the respective plurality of second electrodes 33SP form a lattice pattern where lattice units each having a square shape are arrayed.

The plurality of second electrodes 33SP and an area where the second electrodes 33SP are not located in the second electrode arrangement surface 33S are bonded to the cover layer 22 by the transparent adhesive layer 23 mentioned above.

Cross-Sectional Structure of Display Device

Figure 2:
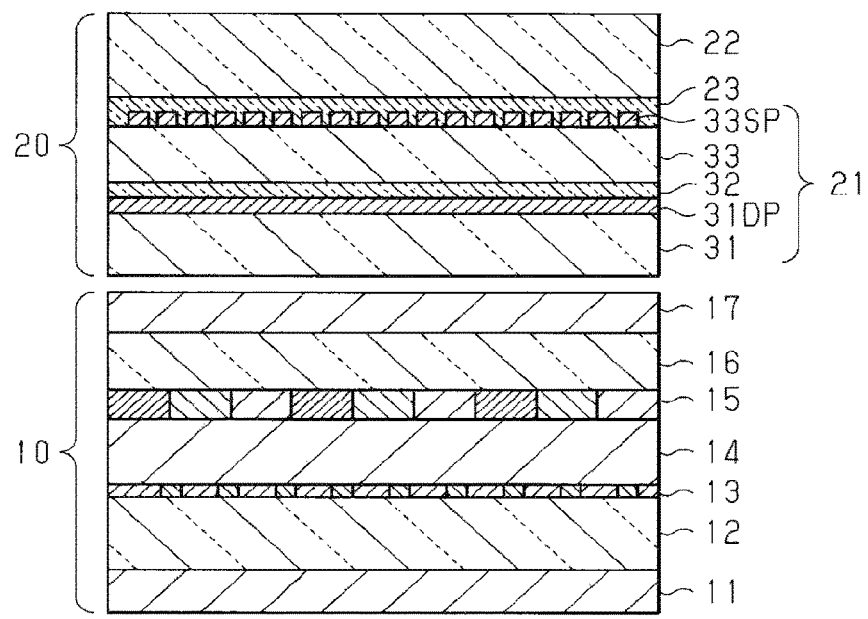
FIG. 2 is a cross-sectional view illustrating an example of a cross-sectional structure of a display device according to an embodiment.

As shown in FIG. 2, the sensor base 20 includes components which are the transparent support substrate 31, the first electrodes 31DP, the transparent adhesive layer 32, the transparent dielectric substrate 33, the second electrodes 33SP, the transparent adhesive layer 23, and the cover layer 22, arranged in order receding from the display panel 10.

Among them, the transparent dielectric substrate 33 is sandwiched by the plurality of first electrodes 31DP and the plurality of second electrodes 33SP. The sensor base 20 configures an example of the touch panel, together with the selection circuit and the detection circuit mentioned above.

The transparent adhesive layer 32 covers and encloses the first electrode wires 31L configuring the first electrodes 31DP and fills the space between the first electrode wires 31L adjacent to each other, being located between the first electrodes 31DP and the transparent dielectric substrate 33. The transparent adhesive layer 23 covers and encloses the second electrode wires 33L configuring the second electrodes 33SP and fills the spaces between the second electrode wires 33L adjacent to each other, being located between the second electrodes 33SP and the cover layer 22. Of these components, at least one of the transparent adhesive layer 23 and the transparent support substrate 31 may be omitted.

The display panel 10 includes a plurality of components which are a lower polarizing plate 11, a thin film transistor (hereinafter, TFT) substrate 12, a TFT layer 13, a liquid crystal layer 14, a color filter layer 15, a color filter substrate 16, and an upper polarizing plate 17, arranged in order of coming closer to the sensor base 20.

In the display device described above, some of components may be omitted or the order of arranging the components may be changed as follows.

Figure 3:
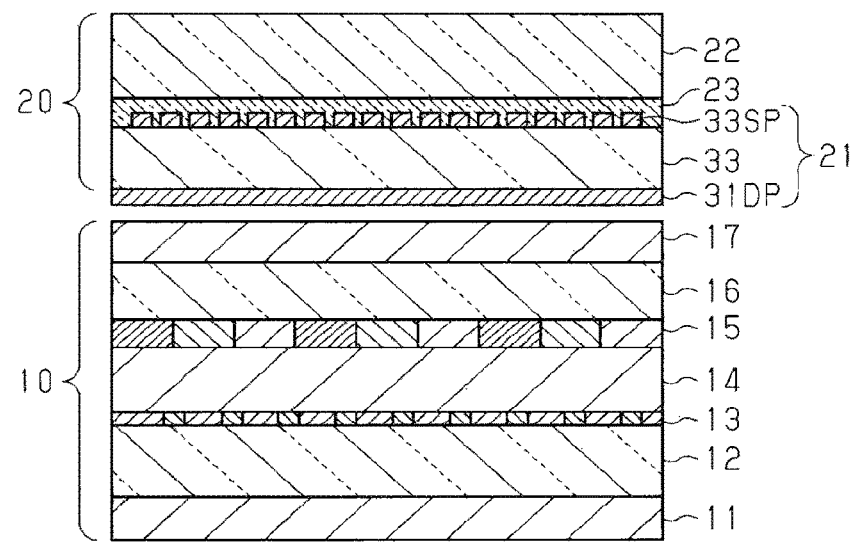
FIG. 3 is a cross-sectional view illustrating another example of a cross-sectional structure of a display device according to an embodiment.

Specifically, as shown in FIG. 3, the transparent support substrate 31 and the transparent adhesive layer 32 may be omitted from the electrode substrate 21 configuring the sensor base 20. In such a configuration, of the surfaces of the transparent dielectric substrate 33, a surface facing the display panel 10 is designed as the first electrode arrangement surface 31S so that the first electrodes 31DP are located at the first electrode arrangement surface 31S. Further, the second electrodes 33SP are located on a surface of the transparent dielectric substrate 33, which is opposite to the first electrode arrangement surface 31S. The first electrodes 31DP are formed, for example, by patterning a thin film formed on the first electrode arrangement surface 31S. The second electrodes 33SP are also formed, for example, by patterning a thin film formed on a surface where the second electrodes 33SP are located.

Figure 4:
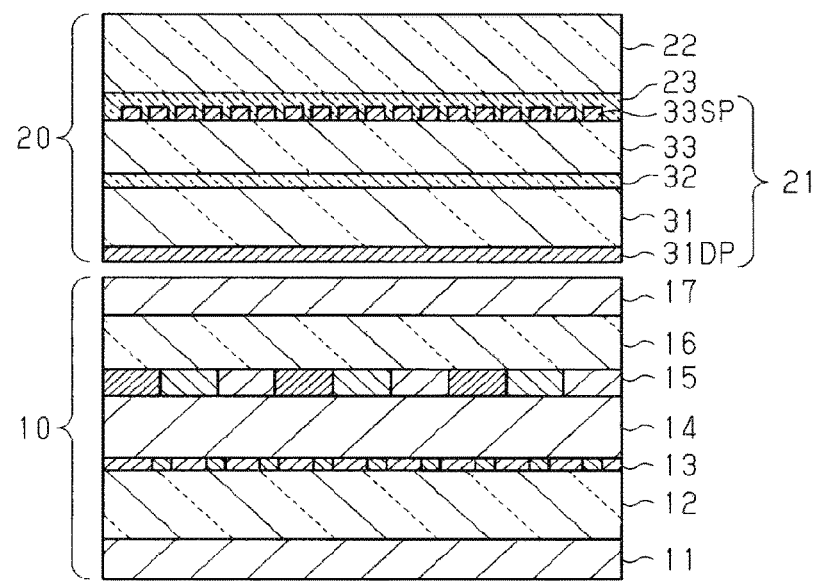
FIG. 4 is a cross-sectional view illustrating another example of a cross-sectional structure of a display device according to an embodiment.

Alternatively, as shown in FIG. 4, the sensor base 20 can include components which are the first electrodes 31DP, the transparent support substrate 31, the transparent adhesive layer 32, the transparent dielectric substrate 33, the second electrodes 33SP, the transparent adhesive layer 23, and the cover layer 22, arranged in order receding from the display panel 10. In such a configuration, for example, the first electrodes 31DP are formed at the first electrode arrangement surface 31S, which is a surface of the transparent support substrate 31, and the second electrodes 33SP are formed at the second electrode arrangement surface 33S, which is a surface of the transparent dielectric substrate 33. Then, the surface of the transparent support substrate 31 opposite to the first electrode arrangement surface 31S and the surface of the transparent dielectric substrate 33 opposite to the second electrode arrangement surface 33S are adhered via the transparent adhesive layer 32. The transparent support substrate 31, the transparent adhesive layer 32, and the transparent dielectric substrate 33 configure the transparent dielectric layer.

Electrical Configuration of Touch Sensor

Figure 5:
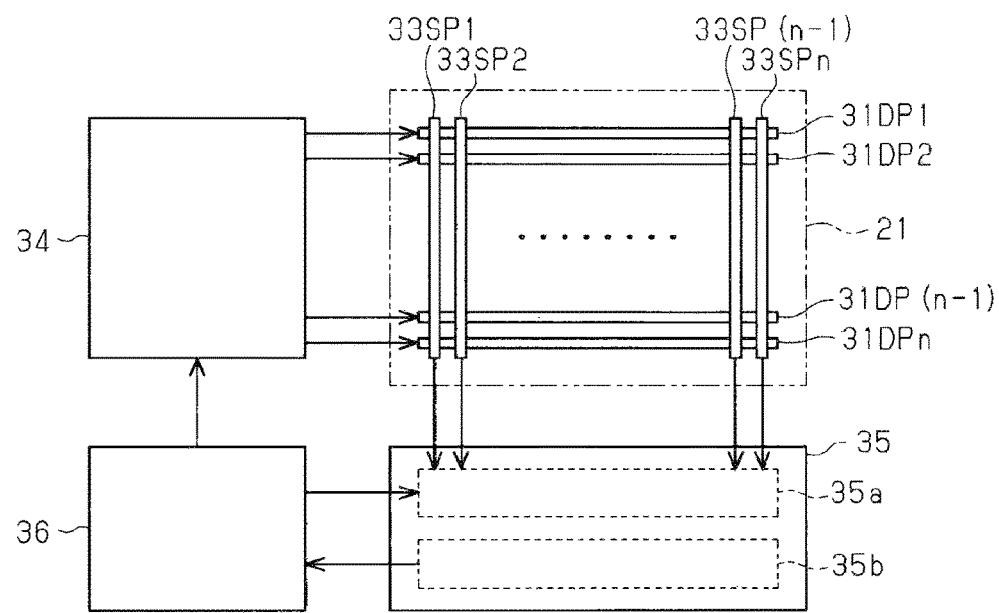
FIG. 5 is a block diagram illustrating an example of an electrical configuration of a touch panel according to an embodiment.

Referring to FIG. 5, the electrical configuration of the touch sensor will be described. In the following description, the electrical configuration will be described by way of an example of a mutual capacitive touch sensor as a capacitive touch sensor.

As shown in FIG. 5, the touch sensor is provided with the sensor base 20, a selection circuit 34, a detection circuit 35, and a control unit 36. The selection circuit 34 is connected to the plurality of first electrodes 31DP, the detection circuit 35 is connected to the plurality of second electrodes 33SP, and the control unit 36 is connected to the selection circuit 34 and the detection circuit 35.

The control unit 36 generates and outputs a start timing signal to cause the selection circuit 34 to start generation of a driving signal to each first electrode 31DP. The control unit 36 generates and outputs a scan timing signal to cause the selection circuit 34 to sequentially scan targets, from the $1^{st}$ to $n^{th}$ first electrodes 31DP, to which the driving signal is supplied.

The control unit 36 generates and outputs a start timing signal to cause the detection circuit 35 to start detection of a current passing through each second electrode 33SP. The control unit 36 generates and outputs a scan timing signal to cause the detection circuit 35 to sequentially scan detection targets from the $1^{st}$ to $n^{th}$ second electrodes 33SP.

The selection circuit 34 starts generation of a driving signal on the basis of the start timing signal outputted from the control unit 36 and scans an output destination of the driving signal from the $1^{st}$ to $n^{th}$ first electrodes 31DP on the basis of the scan timing signal outputted from the control unit 36.

The detection circuit 35 includes a signal acquisition unit 35a and a signal processing unit 35b. The signal acquisition unit 35a starts acquisition of a current signal, which is an analog signal generated by each second electrode 33SP, on the basis of the start timing signal outputted from the control unit 36. Then, the signal acquisition unit 35a scans current signal acquisition sources from the $1^{st}$ to $n^{th}$ second electrodes 33SP on the basis of the scan timing signal outputted from the control unit 36.

The signal processing unit 35b processes each current signal acquired by the signal acquisition unit 35a to generate a voltage signal, which is a digital value, and outputs the voltage signal thus generated to the control unit 36. The selection circuit 34 and the detection circuit 35 generate a voltage signal in this way from a current signal that varies with the change of capacitance to measure the change of the capacitance between the first electrodes 31DP and the second electrodes 33SP. The selection circuit 34 or the detection circuit 35 is an example of the peripheral circuit.

The control unit 36 detects a position touched by a user's fingertip or the like in the sensor base 20 on the basis of the voltage signal outputted from the signal processing unit 35b. In this case, since the first electrodes 31DP and the second electrodes 33SP are arranged in a mesh (matrix), the position of the fingertip or the like in the X direction and the position of the fingertip or the like in the Y direction are independently sensed.

Although the electrical configuration of a mutual capacitive touch sensor is described above as an example of a capacitive type touch sensor, the electrical configuration of the touch sensor described above may be embodied in a self-capacitive touch sensor. The electrical configuration of a self-capacitive touch sensor will be described below. In the self-capacitive touch sensor, a detection range in the first electrodes 31DP is different from that in the second electrodes 33SP, while the method of detection in the first electrodes 31DP is similar to that in the second electrodes 33SP. Hereinafter, the detection method will be described using the second electrodes 33SP as an example.

A driving semiconductor device (power supply) is connected to both sides of each second electrode 33SP via respective connection terminals. The situation is schematically shown in FIG. 6.

Figure 6:
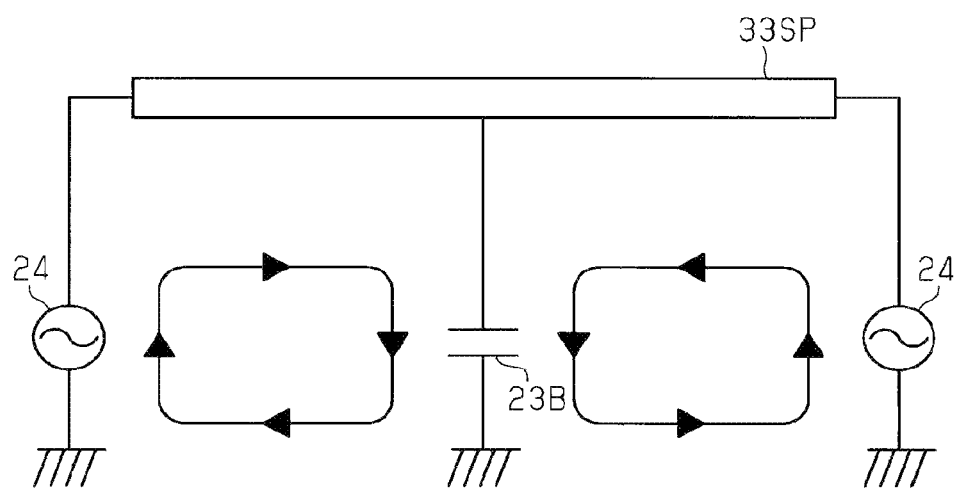
FIG. 6 is a circuit diagram illustrating another example of an electrical configuration of a touch panel according to an embodiment.

As shown in FIG. 6, alternating current signals 24 of the same phase at the same voltage are applied to both sides of the second electrode 33SP. Since the voltages at both ends are the same, current does not flow through the second electrode 33SP as a rule. From this state, when a finger having electrical conductivity and capacitance approaches the second electrode 33SP from above, capacitive coupling 23B is produced between the second electrode 33SP and the finger. The capacitive coupling 23B thus produced forms a closed circuit via the human body to cause alternating current to flow through the second electrode 33SP. In this case, since the current flows through the second electrode 33SP, the resistance of the second electrode 33SP is desirably low.

The current flowing through the second electrode 33SP passes through the semiconductor devices and flows into the capacitive coupling 23B from both sides of the second electrode 33SP. The amount of current flowing from either one of both sides depends on the position where the capacitive coupling is produced on the second electrode 33SP. Also, the amount of current flowing from either one of both sides is characterized in that the amount does not rely on the impedance of the object that has approached or contacted the second electrode 33SP. The current flowing into the second electrode 33SP can be estimated from a voltage thereacross by providing resistance elements (not shown) at both ends of the second electrode 33SP, and the position of the capacitive coupling 23B on the second electrode 33SP is calculated from this information.

Such second electrodes 33SP are arrayed in the Y direction and the first electrodes 31DP capable of detecting a position similarly to the second electrodes 33SP are arrayed in the X direction to achieve the function of a position sensor which detects a position in two dimensional directions. According to this principle, if there are a plurality of contacts simultaneously, each contact position can be specified.

Whether a touch sensor uses a mutual capacitive method or uses a self-capacitive method, the position resolution is enhanced by making the mesh finer. On the other hand, since an image on the operation surface 20S is visually recognized through the lattice configured by the first electrode wires 31L adjacent to each other and the second electrode wires 33L adjacent to each other, the visibility of the image increases by making the mesh coarser. The function as a sensor can be discussed based on the structure made up of one first electrode 31DP and one second electrode 33SP. The first electrode wires 31L and the second electrode wires 33L are usually in a linear shape, but may alternatively be zigzagged, for example, as in a polygonal line shape, a sine wave shape, and a square wave shape.

Cross-Sectional Structure of Sensor Base 20

The following description specifically addresses the cross-sectional structure of the sensor base 20, including the cross-sectional structure shown in FIGS. 2 to 4, by way of examples.

Figure 7:
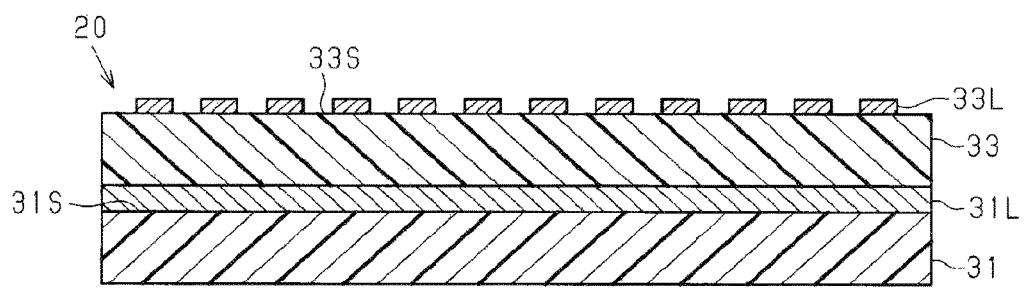
FIG. 7 is a cross-sectional view illustrating an example of a cross-sectional structure of a sensor base according to an embodiment.

As shown in FIG. 7, in an example of the cross-sectional structure of the sensor base 20, the first electrode wires 31L are arranged on the transparent support substrate 31 and the second electrode wires 33L are arranged on the transparent dielectric substrate 33. In this case, the surface of the transparent support substrate 31 where the first electrode wires 31L are formed serves as the first electrode arrangement surface 31S, and the surface of the transparent dielectric substrate 33 where the second electrode wires 33L are formed serves as the second electrode arrangement surface 33S. Also, in terms of an arrangement of the first electrode wires 31L and the second electrode wires 33L relative to the transparent dielectric substrate 33, the second electrode wires 33L are arranged on the front surface of the transparent dielectric substrate 33 and the first electrode wires 31L are arranged on the back surface of the transparent dielectric substrate 33. That is, when viewed from an observer, the second electrode wires 33L are arranged on a front surface and the first electrode wires 31L are arranged on a back surface. The sensor base 20 having such a cross-sectional structure is included in the cross-sectional structure of the display device described referring to FIG. 2. Such a structure is formed, for example, by bonding the transparent support substrate 31 formed with the first electrode wires 31L to the transparent dielectric substrate 33 formed with the second electrode wires 33L via an adhesive layer interposed therebetween. Further, the transparent support substrate 31 as an example of the substrate may be configured by a transparent substrate and an adhesive layer, and the first electrode arrangement surface 31S may be a surface of the adhesive layer to which the first electrodes 31DP are adhered. Moreover, the transparent dielectric substrate 33 as an example of the substrate may be configured by a transparent substrate and an adhesive layer, and the surface on which the second electrode wires 33L are formed may be a surface of the adhesive layer to which the second electrode wires 33L are adhered.

Figure 8:
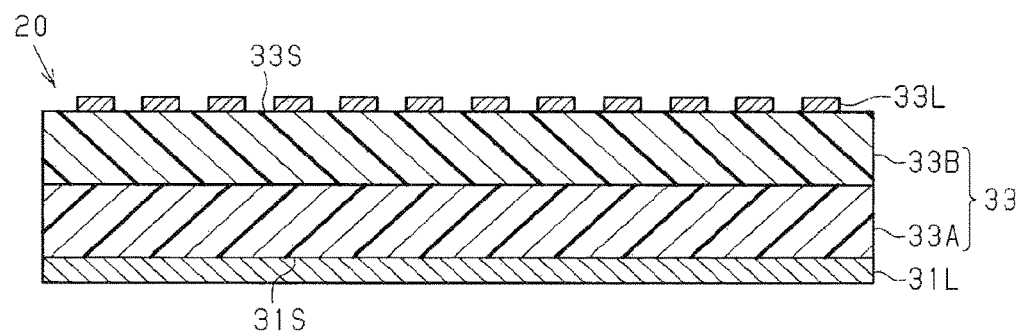
FIG. 8 is a cross-sectional view illustrating another example of a cross-sectional structure of a sensor base according to an embodiment.

As shown in FIG. 8, in another example of the cross-sectional structure of the sensor base 20, the transparent dielectric substrate 33 includes a first transparent dielectric substrate 33A and a second transparent dielectric substrate 33B. The first electrode wires 31L are arranged on the first transparent dielectric substrate 33A, and the second electrode wires 33L are arranged on the second transparent dielectric substrate 33B. In this case, the surface of the first transparent dielectric substrate 33A where the first electrode wires 31L are formed serves as the first electrode arrangement surface 31S, and the surface of the second transparent dielectric substrate 33B where the second electrode wires 33L are formed serves as the second electrode arrangement surface 33S. Also, in terms of an arrangement of the first electrode wires 31L and the second electrode wires 33L relative to the transparent dielectric substrate 33, the second electrode wires 33L are arranged on the front surface of the transparent dielectric substrate 33 and the first electrode wires 31L are arranged on the back surface of the transparent dielectric substrate 33. That is, as viewed from an observer, the second transparent dielectric substrate 33B formed with the second electrode wires 33L and the first transparent dielectric substrate 33A formed with the first electrode wires 31L are layered back to back. The sensor base 20 having such a cross-sectional structure is included in the cross-sectional structure of the display device described referring to FIG. 4. Such a structure is formed, for example, by bonding the first transparent dielectric substrate 33A formed with the first electrode wires 31L to the second transparent dielectric substrate 33B formed with the second electrode wires 33L via an adhesive layer interposed therebetween. Further, the first transparent dielectric substrate 33A as an example of the substrate may be configured by a transparent substrate and an adhesive layer, and the first electrode arrangement surface 31S may be a surface of the adhesive layer to which the first electrode wires 31L are adhered. Moreover, the second transparent dielectric substrate 33B as an example of the substrate may be configured by a transparent substrate and an adhesive layer, and the second electrode arrangement surface 33S may be a surface of the adhesive layer to which the second electrode wires 33L are adhered.

Figure 9:
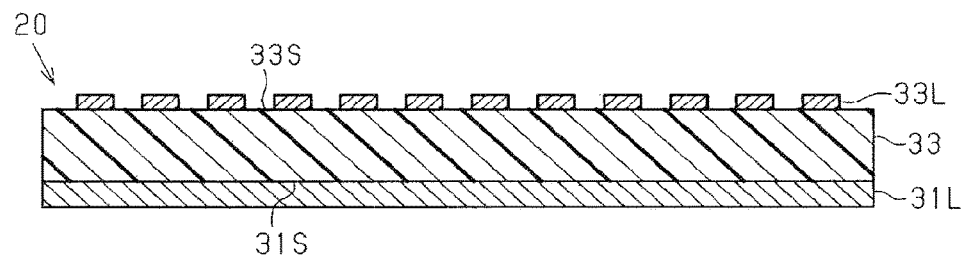
FIG. 9 is a cross-sectional view illustrating another example of a cross-sectional structure of a sensor base according to an embodiment.

As shown in FIG. 9, in another example of the cross-sectional structure of the sensor base 20, the first electrode wires 31L are arranged on the transparent support substrate 31, and the second electrode wires 33L are arranged on the transparent dielectric substrate 33. In this case, the surface of the transparent support substrate 31 where the first electrode wires 31L are formed serves as the first electrode arrangement surface 31S, and the surface of the transparent dielectric substrate 33 where the second electrode wires 33L are formed serves as the second electrode arrangement surface 33S. Also, in terms of an arrangement of the first electrode wires 31L and the second electrode wires 33L relative to the transparent dielectric substrate 33, the second electrode wires 33L are arranged on the front surface of the transparent dielectric substrate 33, and the first electrode wires 31L are arranged on the back surface of the transparent dielectric substrate 33. The sensor base 20 having such a cross-sectional structure is included in the cross-sectional structure of the display device described referring to FIG. 2.

Figure 10:
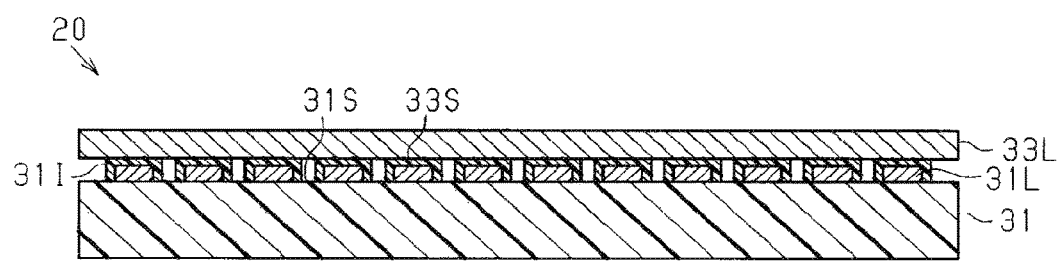
FIG. 10 is a cross-sectional view illustrating another example of a cross-sectional structure of a sensor base according to an embodiment.

As shown in FIG. 10, in another example of the cross-sectional structure of the sensor base 20, the first electrode wires 31L are arranged on the transparent support substrate 31, and the second electrode wires 33L are arranged on an insulating resin layer 31I covering the first electrode wires 31L. In this case, the surface of the transparent support substrate 31 where the first electrode wires 31L are formed serves as the first electrode arrangement surface 31S, and the surface of the insulating resin layer 31I where the second electrode wires 33L are formed serves as the second electrode arrangement surface 33S. Also, in terms of an arrangement of the first electrode wires 31L and the second electrode wires 33L relative to the insulating resin layer 31I, the second electrode wires 33L are arranged on a front surface of the insulating resin layer 31I, and the first electrode wires 31L are arranged on a back surface of the insulating resin layer 31I. Such a configuration of a touch sensor with a thin substrate can contribute to reducing weight of the touch sensor. As shown in the examples of FIGS. 7 to 9, in the structure of forming the first electrode wires 31L separately from the second electrode wires 33L on the front and back surfaces of a substrate, such an insulating resin layer 31I can be eliminated owing to the insulation properties of the substrates.

An electrode made of a metal material has metallic luster on the surface, unlike an electrode made of a transparent conductive material. Accordingly, more light is reflected from the metal electrode than from a transparent electrode and, in addition, the metal electrode decreases contrast of a display image more than a transparent electrode and at the same time is likely to be visually recognized.

Figure 11:
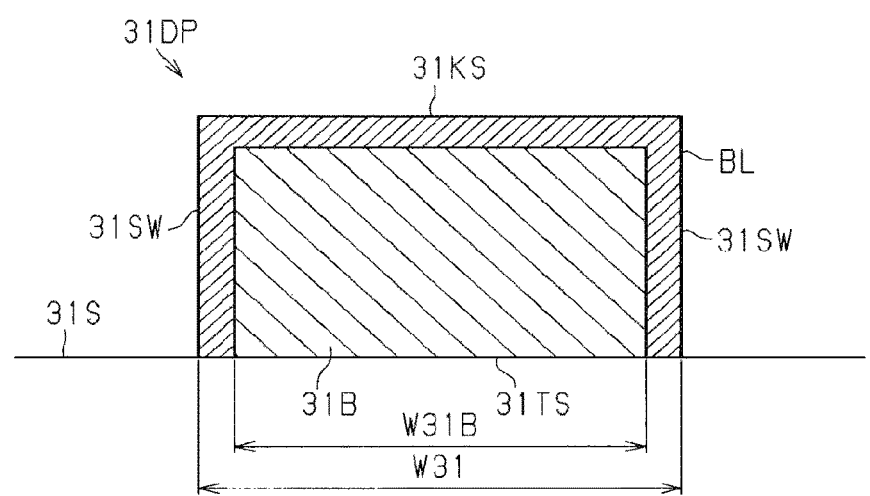
FIG. 11 is a cross-sectional view illustrating an example of a cross-sectional structure of an electrode wire according to an embodiment.

In this connection, at least the first electrodes 31DP or the second electrodes 33SP described above are provided with a blackened layer BL as a surface layer of the electrodes. The blackened layer BL is provided to surfaces, among the surfaces of each of the electrodes, exposed from the surface where the electrodes are formed. The blackened layer BL does not have a metallic luster and is particularly located on side surface areas that are viewed obliquely, among the surfaces of each of the electrodes to be provided with the blackened layer BL. FIG. 11 shows an example in which the first electrode 31DP is provided with the blackened layer BL.

As shown in FIG. 11, the first electrode 31DP is provided with the blackened layer BL on surfaces exposed from the first electrode arrangement surface 31S, among the surfaces of the first electrode 31DP. The blackened layer BL is a surface layer with suppressed metallic luster and is located on side surfaces 31SW of the first electrode 31DP that are viewed obliquely, among the surfaces of the first electrode 31DP. The blackened layer BL is located not only at the side surfaces 31SW but also in an area other than the side surfaces 31SW among the surfaces of the first electrode 31DP.

For example, when the cross-sectional shape of the first electrode 31DP is rectangular, the blackened layer BL is provided not only on the side surfaces 31SW but also at least on either a bottom surface 31TS contacting the first electrode arrangement surface 31S, or a top surface 31KS opposite to the bottom surface 31TS in the first electrode 31DP.

The blackened layer BL is formed by applying blackening treatment, which is a process of reducing surface reflection, to a surface of a conductive film 31B configuring the first electrode 31DP. The first electrode 31DP containing the blackened layer BL has a wire width as an electrode width W31. A body portion maintaining the composition of the conductive film 31B in the first electrode 31DP after blackening treatment has a wire width as a body width W31B. Also, a width obtained by subtracting the body width W31B from the electrode width W31 is a blackened width. To prevent increase in resistance due to the formation of the blackened layer BL, the blackened layer BL preferably has a thickness of 0.2 µm or less, and, preferably, a change in wire width before and after the blackening treatment is 0.3 µm or less.

The structure with the blackened layer BL located on the bottom surface 31TS as well as the side surfaces 31SW is formed by transferring a first electrode 31DP applied with blackening treatment to the first electrode arrangement surface 31S. Also, the structure with the blackened layer BL located on the top surface 31KS as well as the side surfaces 31SW is formed by applying blackening treatment to a first electrode 31DP formed on the first electrode arrangement surface 31S.

The structure with the blackened layer BL located on both the bottom surface 31TS and the top surface 31KS as well as the side surfaces 31SW is formed by transferring a first electrode 31DP applied with blackening treatment to the first electrode arrangement surface 31S, and further applying blackening treatment to the top surface 31KS of the transferred first electrode 31DP. Of these structures, the structure shown in FIG. 11 is an example of providing the blackened layer BL on the side surfaces 31SW and the top surface 31KS. That is, the structure employs a configuration in which the entire surface of the first electrode 31DP other than the area contacting the first electrode arrangement surface 31S is covered with the blackened layer BL for coloring.

In the absence of the blackened layer BL from the bottom surface 31TS, that is, in the structure where the bottom surface 31TS faces the observer, visibility of the electrode is increased due to higher reflectivity of the first electrode 31DP than in a structure with the bottom surface 31TS having the blackened layer BL. In this case, as shown in FIG. 7, the increase of reflectivity is suppressed, for example, by achieving back-and-front bonding, although interface reflection occurs to some extent due to the difference in electrode level. Therefore, in the structure where the bottom surface 31TS is not provided with a blackened layer BL, it is preferable to use the structure, as shown in FIG. 10, where the top surface 31KS faces an observer.

In the absence of the blackened layer BL from the top surface 31KS, that is, in the structure where the top surface 31KS faces the observer, visibility of the electrode is increased due to higher reflectivity of the first electrode 31DP than in a structure with the top surface 31KS having the blackened layer BL. Therefore, in the structure where the top surface 31KS is not provided with a blackened layer BL, it is preferable to use the structure, as shown in FIG. 8, where the substrates are bonded back to back so that the bottom surface 31TS faces the observer.

As described above, according to the structure where the side surfaces and at least one of the top and bottom surfaces of the electrode serve as the surface of the blackened layer BL, metallic luster is suppressed on surfaces that are viewed obliquely among the surfaces of the electrode. Since the blackened layer BL is a surface layer of the electrode, low resistance of the metal is kept in the body of the electrode, and as a result, increase in resistance of the electrode is reduced and visibility of the electrode is minimized.

Method of Producing Sensor Base 20

A method of producing the sensor base 20 will be described below.

First, a conductive film for forming the first electrodes 31DP is formed on a surface of a base material. Next, the conductive film formed on the surface of the base material is subjected to electrode patterning suited to the shape of the plurality of first electrodes 31DP. Then, blackening treatment is applied to the electrode pattern, which is a target of forming the blackened layer BL, to form a touch sensor substrate provided with the first electrodes 31DP.

Further, a conductive film for forming the second electrodes 33SP is formed on a surface of a base material. Next, the conductive film formed on the surface of the base material is processed into an electrode pattern suited to the shape of the plurality of second electrodes 33SP. Then, blackening treatment is applied to the electrode pattern, which is a target of forming the blackened layer BL, to form a touch sensor substrate provided with the second electrodes 33SP.

Subsequently, the first electrodes 31DP and the second electrodes 33SP are arranged such that the transparent dielectric substrate 33 is located between the first electrodes 31DP and the second electrodes 33SP to thereby prepare the sensor base 20 described above.

For example, the front substrate applied with blackening treatment and the back substrate applied with blackening treatment are bonded via an adhesive layer, for example, to obtain the touch sensor substrate shown in FIG. 7. Alternatively, the substrates applied with blackening treatment are bonded back to back via an adhesive layer, for example, to obtain the touch sensor substrate shown in FIG. 8. Alternatively, the first electrodes 31DP are formed on the front surface of a substrate and the second electrodes 33SP are formed on the back surface of the substrate to obtain the touch sensor substrate shown in FIG. 9. Alternatively, an insulating layer is layered on the first electrodes 31DP applied with blackening treatment, and using this as a base material, a conductive film, such as a copper foil, for forming the second electrodes 33SP is layered on the insulating layer. Then, the conductive film formed on the insulating layer is patterned into a plurality of second electrodes 33SP and the patterned second electrodes 33SP are subjected to blackening treatment to obtain the touch sensor substrate shown in FIG. 10.

In this case, the base material to be formed with the first electrodes 31DP is appropriately selected according to the cross-sectional structure of the sensor base 20 described above, and thus may be the transparent support substrate 31, or may be the transparent dielectric substrate 33, or may be a transfer substrate, which is a base material for transferring the electrodes to the transparent support substrate 31 or the transparent dielectric substrate 33. The base material to be formed with the second electrodes 33SP is also appropriately selected according to the cross-sectional structure of the sensor base 20 described above, and thus may be the transparent support substrate 31, or may be the transparent dielectric substrate 33, or may be a transfer substrate. The base material may be formed of only a transparent base material or may be formed of a transparent base material and an adhesive layer. The first electrodes 31DP and the second electrodes 33SP may be formed on the transparent base material or may be formed on the adhesive layer.

As the base material to be formed with the electrodes, for example, a glass substrate, a resin substrate, or a film base material is used. Of the glass substrate, the resin substrate and the film base material, a film base material is desirably used from the perspective of low cost and light weight. Materials that can be used for the film base material include polyethylene terephthalate (PET), polycarbonate (PC), a cycloolefin polymer (COP), a cyclic olefin copolymer (COC), and the like. The film base material has a thickness appropriately set in a range, for example, of not less than 20 μm and not more than 200 μm.

As the conductive film to be processed into the electrode pattern, a single layer film made of a single metal component, such as copper or aluminum (Al), or a laminated film of Mo (molybdenum)/Al/Mo or the like can be used. From the perspective of low resistance of the electrodes and ease of producing the electrodes, copper is most preferable for the material for forming the electrodes. A laminated film such as of Mo/Al/Mo is preferably used as an electrode installed side-by-side with ITO. As a method of forming such a conductive film on a base material, any of direct film deposition by means of vapor deposition, sputtering, or the like, an electrolytic process, and bonding of rolled metal foil is applied.

In vapor deposition, a material, such as metal, including copper or aluminum, or a metal oxide, is vaporized or sublimated in a vacuum vessel containing a transparent base material and the vaporized or sublimated material is deposited onto a surface of the transparent base material that is distanced from the material as the vapor deposition source to form a thin film. In sputtering, a target is placed in a vacuum vessel containing a transparent base material, followed by ionizing a sputtering gas, such as noble gas, nitrogen, and oxygen in the vacuum vessel to cause the ionized particles to collide with the target to which a high voltage is applied. The atoms emitted from the target surface are then attached to the surface of the transparent base material to form a thin film. In an electrolytic process, metal ion is electrodeposited onto a surface of a transparent base material in a solution in which metal ion is dissolved. A method of forming an electrode on a surface of a transparent base material may employ any of these methods. The thickness of the electrode is appropriately determined on the basis of the conductivity required of the electrode and the wire width required of the electrode, and is set, for example, to not less than 0.1 μm and not more than 20 μm.

For the blackening treatment, at least one of metal plating, such as chromium plating and nickel plating, black sulfide treatment, black oxide treatment, black substitution treatment, and black roughening treatment is used. A preferred method is selected from these treatments, from the perspective of suppressing increase in resistance of the electrode and of lowering reflectivity of the electrode.

In black sulfide treatment, for example, hydrogen sulfide, which is a decomposition product of heating a sulfur component contained in cystine or methionine as an amino acid that is contained in egg white, is reacted with an iron component that is contained in egg yolk to produce iron sulfide which is blue or black. Such blackening is a reaction that is also found in a metal element, such as copper or lead, instead of the iron component contained in egg yolk. In the reaction, an electrode pattern is immersed in an appropriate sulfurization solution for blackening the electrode pattern to change the color appearing on the surface of the electrode pattern to blue or black.

In black oxide treatment, a surface of an electrode pattern is oxidized to produce metal oxide on the surface of the electrode pattern to change the color appearing on the surface of the electrode pattern to blue or black.

In black substitution treatment, metal atoms configuring a surface of an electrode pattern are substituted by other metal atoms. Such a substitution is a reaction making use of the difference in electrode ionization tendency between the metal atoms configuring the surface of the electrode patterns and other metal atoms. That is, metal having a higher ionization tendency is immersed in a solution that contains metal ions having a lower ionization tendency to cause the metal having a higher ionization tendency to be dissolved into the solution and turn to metal ions, thereby emitting electrons. The electrons reduce the metal having a lower ionization tendency to precipitate the metal having a lower ionization tendency. For example, when the material for forming an electrode pattern is copper, the metal having a higher ionization tendency corresponds to copper. In this case, metal ions having a lower ionization tendency than that of copper are selected to cause the substitution reaction.

In black roughening treatment, minute concavities and convexities are formed in a mirror finished metal surface to reduce reflectivity of the metal surface. This treatment is also referred to as soft etching. An example of black roughening treatment includes a chemical treatment of immersing an electrode pattern in a chemical solution, such as an acidic solution, or physical treatment of sputtering a surface of an electrode pattern.

EXAMPLE 1

With reference to (a) to (e) of FIG. 12, an example of a method of producing a touch sensor substrate will be described. Since a method of forming the first electrodes 31DP is basically similar to a method of forming the second electrodes 33SP, the following description sets forth an example of obtaining a touch sensor substrate by forming the second electrodes 33SP on a base material to be formed with the second electrodes 33SP. FIG. 12 shows an example of producing an electrode group arrayed in a stripe pattern on PET by photolithography, using PET having a surface bonded with an electrolytic copper foil. However, the method of forming a film of an electrode pattern configuring an electrode group is not limited to bonding of foil.

Figure 12A:
FIGS. 12(a)-12(e) show cross-sectional process diagrams illustrating a method of producing a touch sensor substrate according to an embodiment.

As shown in FIG. 12(a), a PET sheet with a thickness of 50 μm was used as a base material.

Figure 12B:
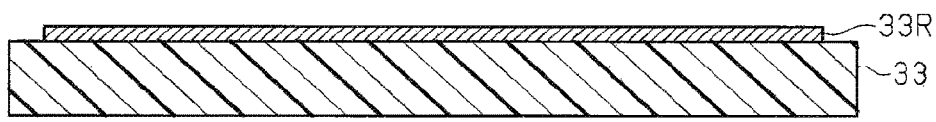

As shown in FIG. 12(b), an electrolytic copper foil 33R with a thickness of 3 μm was lamination-adhered onto the PET sheet. Subsequently, after cleaning a copper foil surface, an acrylic negative resist layer was laminated on the electrolytic copper foil 33R. Then, the acrylic negative resist layer was exposed to ultraviolet rays with exposure intensity of 100 mJ, via a mask in a stripe pattern. Then, the acrylic negative resist layer was developed by a mixed solution of sodium carbonate ($Na_2CO_3$) and sodium hydrogen carbonate ($NaHCO_3$) and unwanted resist was removed to expose part of the underlaid copper foil.

Figure 12C:
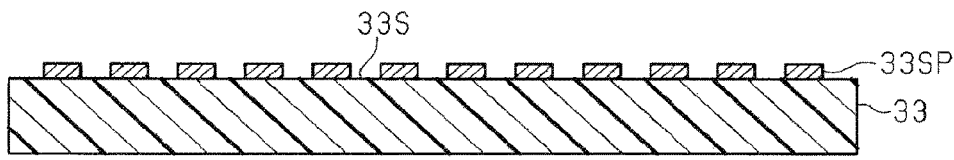

As shown in FIG. 12(c), the copper foil, part of which was covered with the acrylic negative resist layer, was immersed in a ferric chloride solution having a temperature of 60° C. to remove the exposed portion of the copper foil by etching. Then, the residual resist layer was separated by an alkaline solution to obtain the second electrodes 33SP in a striped electrode pattern.

Figure 12D:
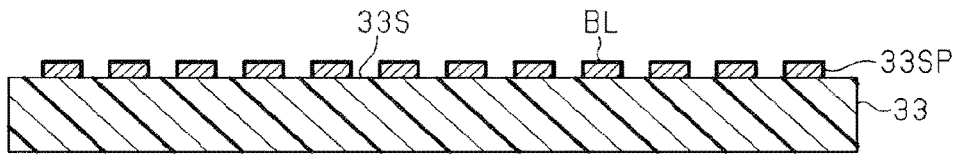

As shown in FIG. 12(d), the electrode pattern was subjected to black sulfide treatment, one of blackening treatments. In this case, a solution containing sodium sulfide ($Na_2S$) as a sulfide component and potassium chloride ($K_2S$) at a concentration in a range of not less than 0.02% to not more than 1% was used as a coloration solution (ammonium chloride solution). Then, the PET sheet formed with the electrode pattern was repeatedly immersed in the ammonium chloride solution. As a result, copper sulfide (CuS) was precipitated on the surface of the second electrodes 33SP to gradually change the color of the surface of the electrode pattern to blue or black. Thus, there were obtained electrodes having a reflectivity of less than 20% in a visible wavelength range (of not less than 400 nm to not more than 780 nm) and appearing to have a blue hue. As a result of patterning and blackening treatment of the copper foil, the blackened layer BL with a thickness of 0.2 μm was obtained. The surface resistivity of the second electrodes 33SP having the blackened layer BL, that is, the surface resistivity of the blackened layer BL was less than 1 Ω/square.

On the other hand, in a state where the electrode surface appeared black, which indicates convergence of the sulfurization reaction, the surface resistivity of the electrodes showed a value of several tens of Ω/square. The blackened layer BL in this case had a thickness of approximately 0.25 μm or more. From these results, to reduce increase in resistance of the electrodes, duration of time of applying sulfurization treatment is preferably within a range of allowing the blackened layer BL to have a thickness of 0.2 μm or less, and preferably within a range of allowing the electrode pattern surface to appear blue.

The covering state of the blackened layer BL shown in FIG. 12(d) is only schematic. A smaller wire width of the second electrodes 33SP will cause the second electrodes 33SP to be in a more rounded semicylindrical shape, and thus it will be more difficult to distinguish side surfaces from a top surface in the second electrodes 33SP.

Figure 12E:
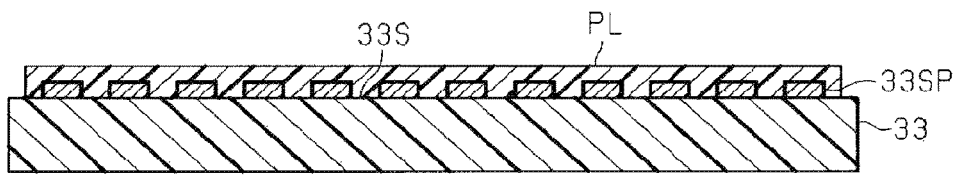

As shown in FIG. 12(e), the surface of the second electrodes 33SP including the blackened layer BL was coated with a protective layer PL to protect the second electrodes 33SP to thereby obtain a touch sensor substrate. After forming the electrode group on the substrate, the electrodes are preferably covered with the protective layer PL to prevent contamination and detachment of the electrodes or the blackened layer BL due to contact. In forming the protective layer PL, an acrylic UV curing adhesive sheet, for example, was cut into a size of enabling protection of the electrodes and laminated. Then, the UV curing adhesive sheet was irradiated with UV light at approximately 1000 mJ to cure the UV curing adhesive sheet. Thus, an upper portion of the sensor including the electrodes and excluding the connection terminals was covered with the protective layer PL.

EXAMPLE 2

Electrodes having the blackened layer BL of Example 2 were obtained under the same conditions as in Example 1 except that the black sulfide treatment of Example 1 was changed to black substitution treatment. Specifically, copper on the surface of copper electrodes was substituted by palladium (Pd), followed by adhesion. In this case, the PET sheet formed with the electrode pattern mentioned above was immersed in a hydrochloric acid solution containing Pd in a range of not less than 100 ppm to not more than 500 ppm. Then, when the color of the electrode pattern tuned blue, reflectivity was suppressed to less than 20% in a visible wavelength range (of not less than 400 nm to not more than 780 nm) and surface resistivity was suppressed to 1 Ω/square or less. In this case as well, the blackened layer BL had a thickness of approximately 0.2 μm. From these results, to reduce increase in resistance of the electrodes, duration of time of applying sulfurization treatment is preferably in a range of allowing the thickness of the blackened layer BL to be 0.2 μm or less, and preferably in a range of causing the electrode pattern surface to appear blue.

As described above, a smaller wire width of the electrode pattern will cause the electrode pattern to be in a more rounded semicylindrical shape, and thus it will be difficult to distinguish side surfaces from a top surface in the electrode pattern. Accordingly, the state of the blackened layer BL having a thickness of 0.2 μm indicates a state of a surface of the electrode pattern other than the bottom surface covered with the blackened layer BL with a thickness of approximately 0.2 μm.

Table 1 shows measurements of reflectivity of an untreated electrode in a stripe pattern not subjected to blackening treatment, reflectivity of the electrode after blackening treatment of Example 1, and reflectivity of the electrode after blackening treatment of Example 3. The measurements of representative wavelengths are shown.

TABLE 1

|  | Reflectivity | | | | |
| --- | --- | --- | --- | --- | --- |
|  | 400 nm | 500 nm | 600 nm | 700 nm | 780 nm |
| Untreated | 18.8 | 21.2 | 32.7 | 37.3 | 39.2 |
| Sulfide Blackening | 10 | 12.6 | 7.6 | 5.4 | 9.8 |
| Pd Blackening | 4 | 5.1 | 4.5 | 10.2 | 14.9 |

As shown in Table 1, the untreated substrate had a reflectivity increased at 550 nm or higher. This reflects metallic properties of copper and indicates that the reflection from the lustrous surface of copper was considerably great. Reflectivity in this area was reduced significantly by black sulfide treatment and black substitution treatment and was suppressed to 15% or less in black sulfide treatment and black substitution treatment. Such reflectivity, if it is less than 20%, is sufficient in general. Also, black sulfide treatment and black substitution treatment demonstrated great decrease of reflectivity even at shorter wavelengths.

EXAMPLE 3

Electrodes having the blackened layer BL of Example 3 were obtained under the same conditions as in Example 1 except that black sulfide treatment of Example 1 was changed to metal plating (Ni, Cr) treatment. According to the electrodes obtained by metal plating (Ni, Cr) treatment, reflectivity in the visible wavelength range (of not less than 400 nm to not more than 780 nm) was reduced more than that of an electrode not subjected to blackening treatment. However, it was found to be difficult to satisfy both of reflectivity being less than 20% and surface resistivity being 1 Ω/square as in Examples 1 and 2.

EXAMPLE 4

Electrodes having the blackened layer BL of Example 4 were obtained under the same conditions as in Example 1 except that black sulfide treatment of Example 1 was changed to black roughening treatment. According to the electrodes obtained by black roughening treatment, reflectivity in a visible wavelength range (of not less than 400 nm to not more than 780 nm) was reduced more than that of an electrode not subjected to blackening treatment. However, it was found to be difficult to satisfy both of reflectivity being less than 20% and surface resistivity being 1 Ω/square as in Examples 1 and 2.

In black sulfide treatment or black substitution treatment that satisfies both of reflectivity being less than 20% and surface resistivity being 1 Ω/square, the blackened layer BL on the copper surface had a thickness of 0.2 μm or less. It was also found that a structure with a thickness of the blackened layer BL being greater than 0.2 μm did not satisfy either one of reflectivity being less than 20% and surface resistivity being 1 Ω/square.

In contrast, in metal plating or black roughening treatment, the blackened layer BL had no alternative but to have a film thickness larger than that in black sulfide treatment or black substitution treatment, in order to have reflectivity of 20% or less in the entire visible wavelength range (of not less than 400 nm to not more than 780 nm). It was found after all that surface resistivity became high. Further, as the blackened layer BL had a larger thickness, it was found that there was a tendency of the blackened layer BL being brittler and being more easily detached. A detached blackened layer BL has a risk of being visually recognized as a foreign substance or causing short circuit, and from this perspective, the blackened layer BL having a larger thickness is not preferable. In black sulfide treatment and black substitution treatment, such detachment was not found.

EXAMPLE 5

An example of forming the insulating resin layer 31I of FIG. 10 will be described.

After forming a unidirectionally extending electrode group, the insulating resin layer 31I was formed as follows. An insulating material used was an acrylic UV curing adhesive sheet having high light transmission properties with a dielectric constant of not less than 2 and not more than 4.

The acrylic UV curing adhesive sheet was cut into a size of enabling protection of the electrode group and laminated. Then, the UV curing adhesive sheet was irradiated with UV light at approximately 1000 mJ to cure the UV curing adhesive sheet. Thus, the insulating resin layer 31I was formed in a predetermined area of the electrode group.

A copper foil having the same thickness was bonded from above the insulating resin layer 31I to cover the entire base material, again followed by etching to form another electrode group perpendicular to the electrode group in the layer below the insulating resin layer 31I. After that, the electrode group in the layer below the insulating resin layer 31I and the electrode group in the layer above the insulating resin layer 31I were collectively subjected to blackening treatment in an area visually recognized in plan view. Blackening treatment may be carried out twice, on an electrode group basis.

Black Substitution Treatment

Subsequently, Pd substitution treatment, which is a preferable treatment among blackening treatments, will be described below.

As described above, blackening treatments for fixing black color in a surface of an electrode pattern include black sulfide treatment, black substitution treatment, black oxide treatment, black plating treatment, and black roughening treatment. Among them, black plating treatment and black roughening treatment have a tendency of increasing resistance of the blackened layer BL comparing with that in black sulfide treatment and black substitution treatment. Further, in black plating treatment, a temperature of 80° C. or more is required of a plating solution. Therefore, the base material immersed in the plating solution is damaged more than in other treatments.

In black oxide treatment, formation of the blackened layer BL progresses to a terminal, such as a pad for connecting the outer portion of the sensor base 20 to the electrodes. Therefore, black oxide treatment has a tendency of increasing contact resistance between the outer portion of the sensor base 20 and the electrodes. In black sulfide treatment, the blackened layer BL has a tendency of being formed into an acicular shape, and there is a risk of separating the blackened layer BL and increasing the wire width of the electrodes having the blackened layer BL, although the degree is smaller than in black plating treatment or black roughening treatment.

In this regard, black substitution treatment, with which metal atoms on the electrode surface are substituted by other atoms or by a compound of other elements, can reduce visibility of the electrodes described above and can reduce resistance on the electrode surface.

The atoms substituting the metal atoms on the electrode surface may be atoms having an ionization tendency lower than that of the metal atoms and appearing black on the electrode surface. For example, in a structure in which the metal atoms on the electrode surface are Cu, atoms substituting the metal atoms on the electrode surface can include an element selected from the group consisting of Pd, Hg, Ag, Ir, Pt, and Au. Compounds of other elements substituting the metal element on the electrode surface can include a compound containing an element selected from the group consisting of Pd, Hg, Ag, Ir, Pt, and Au. The blackening treatment solution containing such an element has a temperature of 55° C. or less and the duration of time the base material formed with the electrode pattern is immersed in the blackening treatment solution is the duration of time taken for the blackened layer BL to have a thickness of 0.2 µm or less, but should be 120 seconds or less. The duration of time the base material formed with the electrode pattern is immersed in the blackening treatment solution is preferably the time with which the change in width of the electrode pattern after blackening treatment is 0.3 µm or less.

In particular, the atom substituting the metal atom on the electrode surface is preferably Pd. Pd is generally priced more moderately than Au and Pt, and readily ionized comparing with Au and Pt and stable in an ionized state. For example, Pt can be dissolved in aqua regia, or Pt chloride can be dissolved in diluted hydrochloric acid to ionize Pt, however, it is very difficult to stabilize the ionized state comparing with Pd. Pd is readily ionized comparing with Ir and stable in the ionized state. The difference in ionization tendency between Pd and Cu is greater than the difference in ionization tendency between Ag and Cu, and in this regard as well, the atom substituting the metal atom on the electrode surface is preferably Pd than Ag.

When the atom substituting the metal atom on the electrode surface is Pd, a Pd solution as the blackening treatment solution has a Pd concentration of preferably not less than 100 ppm and not more than 500 ppm, and more preferably from 200 ppm or more to 300 ppm. As long as the Pd concentration is not less than 100 ppm and not more than 500 ppm, stagnation of the substitution reaction that would be caused by a low Pd concentration is prevented, and excessive development of the substitution reaction that would be caused by a high Pd concentration is prevented. The Pd solution preferably has a pH of not less than 1.5 and not more than 2.5, and more preferably not less than 1.8 and not more than 2.1. As long as the blackening treatment solution has a pH of not less than 1.5 and not more than 2.5, the ionized state of Pd can be kept stably in the blackening treatment solution. The Pd solution has a temperature of not less than normal temperature and not more than 55° C., and preferably not less than 35° C. and not more than 55° C. As long as the blackening treatment solution has a temperature of not less than normal temperature and not more than 55° C., the ionized state of Pd can also be stably kept in the blackening treatment solution. The duration of time the base material formed with the electrode pattern is immersed in the Pd solution is 120 seconds or less, preferably not less than 10 seconds and not more than 120 seconds, and more preferably not less than 45 seconds and not more than 60 seconds.

EXAMPLE 6

Pd substitution treatment as an example of the black substitution treatment described above will be described below.

Pd substitution treatment includes preprocessing, preprocessing water washing, blackening treatment, blackening water washing, and drying in this order. Table 2 shows an example of the conditions in the preprocessing, preprocessing water washing, blackening treatment, blackening water washing, and drying.

TABLE 2

| Step | Chemical Solution | Concentration | Temp. | Processing Method | Processing Time |
| --- | --- | --- | --- | --- | --- |
| Preprocess | Sulfuric Acid | Approx. 2% | Normal Temp. | Dip Method | 20-60 sec. |
| Preprocessing Water Washing | Water | | Normal Temp. | Spray Method | 20-40 sec. |
| Black Oxide Treatment | Liquid Mixture | | 45° C. | Dip Method | 45-60 sec. |
| Blackening Water Washing | Water | | Normal Temp. | Spray Method | 20-40 sec. |
| Drying | | | 70° C. | Air Knife Hot Air Drying | 20 sec. |

Formulated liquid: hydrochloric acid, palladium chloride, others (inorganic compound, nitrogen-based organic compound)

pH 1.99

Pd Concentration 250 ppm

In preprocessing, a base material formed with an electrode pattern is immersed in approximately 2% sulfuric acid by a dip method. The processing temperature in the preprocessing is normal temperature and the duration of time the electrode pattern is immersed in the sulfuric acid is not less than 20 seconds and not more than 60 seconds.

In preprocessing water washing, the electrode pattern after preprocessing is washed with water by a spray method. The processing temperature in the preprocessing water washing is normal temperature, and the duration of time of washing with water is not less than 20 seconds and not more than 40 seconds.

In blackening treatment, the electrode pattern after preprocessing water washing is immersed in a blackening treatment solution, or a formulated liquid, by a dip method. The blackening treatment solution contains hydrochloric acid and palladium chloride, and besides them, contains an inorganic compound and a nitrogen-based organic compound. The blackening treatment solution has a pH of 1.99, and has a palladium concentration of 250 ppm. The blackening treatment solution has a temperature of 45° C., and the duration of time the electrode pattern is immersed in the blackening treatment solution is not less than 45 seconds and not more than 60 seconds.

In blackening water washing, the electrode pattern after blackening treatment is washed with water using a spray method. The processing temperature in the preprocessing water washing is normal temperature, and the duration of time of washing with water is not less than 20 seconds and not more than 40 seconds.

In the drying, hot air of 70° C. is blown as an air knife for 20 seconds to the electrode pattern after blackening water washing.

Thus, three electrode patterns having wire widths different from each other were subjected to Pd substitution treatment described above. As a result, in all the electrode patterns, the blackened layer BL was found to be located in all the areas other than surfaces facing the base material among the surfaces of the electrode patterns. That is, when the surfaces facing the base material were bottom surfaces among the surfaces of each electrode pattern, the blackened layer BL was found to be formed on the side surfaces and the top surfaces of the electrode pattern.

Figure 13:
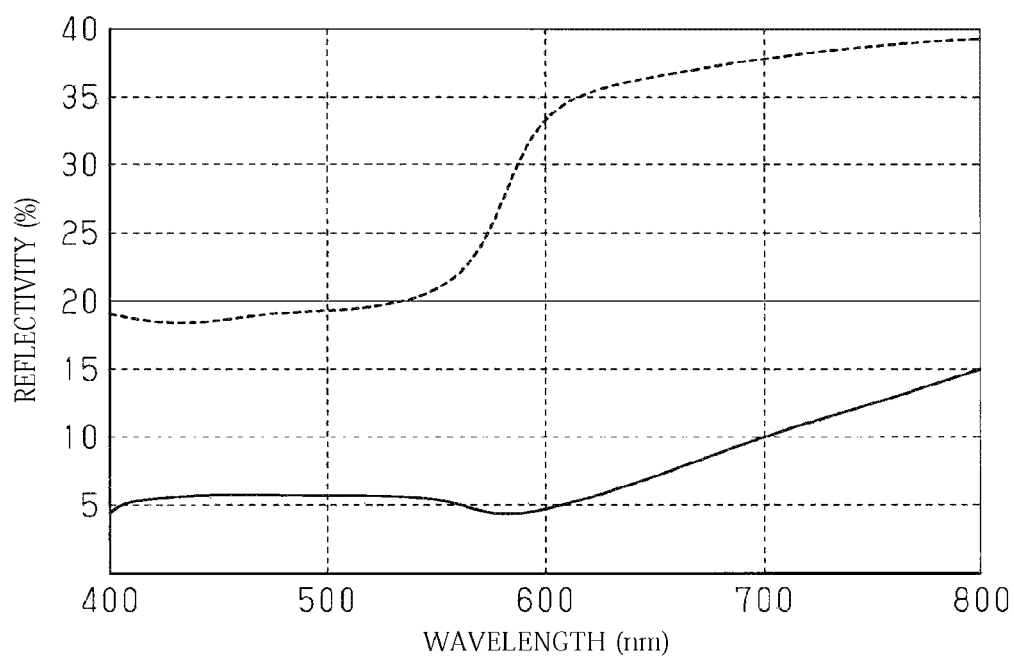
FIG. 13 is a graph illustrating a relationship between reflectivity and wavelength of an electrode pattern, that is, a graph illustrating reflectivity before and after blackening treatment.

Table 3 shows differences in resistance of the electrode patterns before and after Pd substitution treatment. Table 4 shows differences in wire width of the electrode patterns before and after Pd substitution treatment. Regarding contact resistance between the outer portion of the sensor base and the electrode patterns, Table 5 shows differences in the contact resistance of the electrode patterns before and after Pd substitution treatment. Table 6 and FIG. 13 show differences in reflectivity of the electrode patterns before and after Pd substitution treatment. The wire width before Pd substitution treatment in a pattern A was 4.35 μm, the wire width before Pd substitution treatment in a pattern B was 3.95 μm, and the wire width before Pd substitution treatment in a pattern C was 3.56 μm.

TABLE 3

| | | Resistance | | |
|---|---|---|---|---|
| Pattern | Electrode | Before Blackening ($\Omega$) | After Blackening ($\Omega$) | Increase Rate (%) |
| A | First | 0.88 | 0.93 | 5.7 |
| | | 0.90 | 0.97 | 7.8 |
| | Second | 1.10 | 1.20 | 9.1 |
| | | 1.10 | 1.25 | 13.6 |
| B | First | 1.50 | 1.56 | 4.0 |
| | | 1.40 | 1.50 | 7.1 |
| | Second | 1.70 | 1.80 | 5.9 |
| | | 1.65 | 1.80 | 9.1 |
| C | First | 4.40 | 4.80 | 9.1 |
| | | 4.40 | 4.80 | 9.1 |
| | Second | 6.70 | 7.50 | 11.9 |
| | | 6.40 | 7.35 | 14.8 |

TABLE 4

| | Wire Width (μm) | | Amount of Change | |
|---|---|---|---|---|
| Number of Measurements | Before Blackening | After Blackening | $\Delta W$ (μm) | Evaluation $\Delta W < 0.3$ |
| 1 | 4.35 | 4.52 | 0.18 | ○ |
| 2 | 3.95 | 4.02 | 0.07 | ○ |
| 3 | 3.56 | 3.68 | 0.12 | ○ |

TABLE 5

| Immersion | Resistance ($\Omega$) | | |
|---|---|---|---|
| Time (sec) | Before Blackening | After Blackening RA | Evaluation RA < 0.1 |
| 0 | 0.03 | 0.03 | ○ |
| 30 | 0.03 | 0.04 | ○ |
| 45 | 0.03 | 0.02 | ○ |
| 60 | 0.03 | 0.05 | ○ |

TABLE 6

| | Reflectivity | | | | |
|---|---|---|---|---|---|
| | 400 nm | 500 nm | 600 nm | 700 nm | 780 nm |
| Before Blackening | 18.8 | 21.2 | 32.7 | 37.3 | 39.2 |
| After Blackening | 4 | 5.1 | 4.5 | 10.2 | 14.9 |

As shown in Table 3, it was found that, in any of the patterns from A to C, the rate of increase in the resistance of the first electrode was not less than 4.0% and not more than 9.1%, and the rate of increase in the resistance of the second electrode was not less than 5.9% and not more than 14.8%. That is, according to the Pd substitution treatment described above, the rate of increase in the resistance before and after the Pd substitution treatment was found to be 20% or less.

As shown in Table 4, amounts of change in wire width made by the Pd substitution treatment described above were 0.18 μm, 0.07 μm, and 0.12 μm, all of which were found to be 0.3 μm or less.

As shown in Table 5, contact resistance RA after the Pd substitution treatment described above was found to be higher or lower than the resistance before Pd substitution treatment but, in any case, found to exhibit a low resistance of 0.1Ω or less.

As shown in Table 6, reflectivity after the Pd substitution treatment described above showed a tendency of exhibiting substantially a constant value in a wavelength range of not less than 400 nm and not more than 600 nm, and exhibited a higher value as the wavelength became longer, in a wavelength range of not less than 600 nm and not more than 780 nm. Such reflectivity after Pd substitution treatment was found to be reduced more than before Pd substitution treatment, in the wavelength range of not less than 400 nm and not more than 780 nm. Then, as indicated by the solid line in FIG. 13, reflectivity after Pd substitution treatment was found to be 20% or less at any wavelength in the wavelength range of not less than 400 nm and not more than 780 nm. As indicated by the broken line in FIG. 13, reflectivity after Pd substitution treatment was found to be drastically decreased in the wavelength range of not less than 600 nm and not more than 780 nm comparing with reflectivity before Pd substitution treatment. In the wavelength range of not less than 400 nm and not more than 600 nm, reflectivity was found to be 10% or less and the color of the electrode patterns after blackening treatment was found to strongly appear blue or black.

According to the embodiments described above, advantageous effects enumerated below are obtained.

(1) Among the surfaces of an electrode, the blackened layer BL is located on the side surfaces that are viewed obliquely. The location of the blackened layer BL extends in areas besides the side surfaces among the surfaces of the electrode. Thus, reflective luster, which is characteristic of metal, can be suppressed on the side surfaces of the electrode and also the low resistance of the metal can be kept in the areas other than the surface layers. As a result, increase in the resistance of the electrode can be suppressed and visibility of the electrode can be minimized.

(2) Since the blackened layer BL has a surface resistivity of less than 1 Ω/square, increase in the resistance of the electrode due to formation of the blackened layer BL is suppressed in the electrode having the blackened layer BL on the side surfaces.

(3) Since the blackened layer BL has a reflectivity of less than 20% in a visible wavelength range of not less than 400 nm and not more than 780 nm, the effect of item (1) becomes even more significant.

(4) Since the thickness of the blackened layer BL is 0.2 μm or less, if only there is a gap of 1 μm or more between adjacent electrodes, the gap is sufficiently prevented from being filled with the blackened layer BL, or short circuiting is sufficiently prevented from occurring between the adjacent electrodes via the blackened layer BL.

(5) Since the blackened layer BL is formed by black substitution treatment, increase in the resistance of the electrode is suppressed comparing with black plating treatment and black roughening treatment. Comparing with black sulfide treatment, separation of the blackened layer BL is also prevented.

The foregoing embodiments may be implemented with appropriate modifications as follows.

The blackened layer BL may have a thickness of more than 0.2 μm, and the thickness only has to be in a range of obtaining a resistance required of the electrode and, further, of obtaining a detection accuracy required of the touch panel.

The blackened layer BL may have a reflectivity of 20% or more in a visible wavelength range of not less than 400 nm and not more than 780 nm, and in short, the reflectivity may be lower than the reflectivity of the conductive film before being formed with the blackened layer BL.

The blackened layer BL may have a surface resistivity of 1 Ω/square or more, and similarly to the thickness of the blackened layer BL, the surface resistivity only has to be in a range of obtaining a resistance required of the electrode and, further, of obtaining a detection accuracy required of the touch panel.

A process of suppressing the reflective luster characteristic of a metal is equivalent to a process of increasing the resistance of the electrodes. If such a process is applied to the electrodes overall, the resistance of the electrodes will increase beyond an allowable range for a touch sensor.

An aspect of the present invention to provide a touch sensor substrate, a touch panel, a display device, and a method of producing a touch sensor substrate, with which the resistance of an electrode is reduced and visibility of the electrodes is minimized.

A touch sensor substrate for solving the above problems includes: a base material having a first surface, and a plurality of electrodes located on the first surface. Each of the plurality of electrodes includes a bottom surface contacting the first surface, a top surface exposed from the first surface and opposite to the bottom surface, side surfaces exposed from the first surface and linking the bottom surface to the top surface, and a blackened layer serving as a surface layer and having a surface made up of the side surfaces and at least one of the bottom surface and the top surface.

In the above touch sensor substrate, it is preferable that the blackened layer has a surface resistivity of less than 1 Ω/square.

In the above touch sensor substrate, it is preferable that the blackened layer has a thickness of 0.2 μm or less.

In the above touch sensor substrate, it is preferable that the blackened layer has a reflectivity of less than 20% in a visible wavelength range of not less than 400 nm and not more than 780 nm.

A touch panel for solving the above problems includes a sensor base including a plurality of first electrodes, a plurality of second electrodes, and a transparent dielectric layer sandwiched between the plurality of first electrodes and the plurality of second electrodes; a cover layer covering the sensor base, and a peripheral circuit that measures capacitance between the first electrodes and the second electrodes. The touch panel includes the touch sensor substrate, and at least either the first electrodes or the second electrodes are the electrodes included in the touch sensor substrate.

A display device for solving the above problems includes a display panel that displays information, a touch panel that transmits the information displayed by the display panel, and a driving circuit that drives the touch panel. The touch panel is the touch panel described above.

A method of producing a touch sensor substrate for solving the above problems includes forming a plurality of electrode patterns made of metal on a base material having a first surface, each of the plurality of electrode patterns including a bottom surface contacting the first surface, a top surface exposed from the first surface and opposite to the bottom surface, and side surfaces exposed from the first surface and linking the bottom surface to the top surface. The method further includes changing the side surfaces and at least one of the bottom surface and the top surface to a blackened layer, which is a surface layer, by applying blackening treatment that is either black sulfide treatment or black substitution treatment to each of the plurality of electrode patterns.

In the method of producing a touch sensor substrate, it is preferable that the blackening treatment is a black substitution treatment of immersing the electrode patterns in a blackening treatment solution, that is a solution containing Pd ion, and forming a blackened layer on the electrode patterns by a substitution reaction between metal constituting the electrode patterns and the Pd ion; the blackening treatment solution has a temperature of 55° C. or less; and the time the electrode patterns are immersed in the blackening treatment solution is set to 120 seconds or less, and set to a length with which the blackened layer has a thickness of 0.2 μm or less.

In the method of producing a touch sensor substrate, it is preferable that the blackening treatment solution has a temperature of not less than 35° C. and not more than 55° C.; the blackening treatment solution has a Pd concentration of not less than 100 ppm and not more than 500 ppm; the blackening treatment solution has a pH of not less than 1.5 and not more than 2.5; and the duration of time the electrode patterns are immersed in the blackening treatment solution is set to not less than 10 seconds and not more than 120 seconds, and set to a length with which the blackened layer has a thickness of 0.2 μm or less.

In the method of producing a touch sensor substrate, it is preferable that the duration of time the electrode patterns are immersed in the blackening treatment solution is set to a length with which a change in wire width of the electrode patterns before and after the blackening treatment is 0.3 μm or less.

According to a touch sensor substrate, a touch panel, and a display device of the present invention, increase in a resistance of an electrode is reduced and visibility of the electrode included in the touch sensor substrate is minimized.

REFERENCE SIGNS LIST

BL: blackened layer, W31: electrode width, W31B: body width, 10: display panel, 20: sensor base, 22: cover layer, 31DP: first electrode, 31KS: top surface, and 33SP: second electrode.

Obviously, numerous modifications and variations of the present invention are possible in light of the above teachings. It is therefore to be understood that within the scope of the appended claims, the invention may be practiced otherwise than as specifically described herein.

What is claimed is:

1. A touch sensor substrate, comprising:
   a base material having a first surface; and
   a plurality of electrodes each having a bottom surface positioned on the first surface, a top surface opposite to the bottom surface, and side surfaces connecting the bottom and top surfaces, each of the electrodes having a blackened layer formed on the side surfaces and at least one of the bottom and top surfaces,
   wherein the blackened layer has a surface resistivity of less than 1 Ω/square.

2. The touch sensor substrate of claim 1, wherein the blackened layer has a thickness of 0.2 μm or less.

3. The touch sensor substrate of claim 1, wherein the blackened layer has a reflectivity of less than 20% in a visible wavelength range of not less than 400 nm and not more than 780 nm.

4. The touch sensor substrate of claim 2, wherein the blackened layer has a reflectivity of less than 20% in a visible wavelength range of not less than 400 nm and not more than 780 nm.

5. A touch panel, comprising:
   a sensor base including a plurality of first electrodes, a plurality of second electrodes, and a transparent dielectric layer positioned between the first and second electrodes,
   wherein the sensor base includes the touch sensor substrate of claim 1, and the first electrodes and/or the second electrodes are the electrodes of the touch sensor substrate.

6. A touch panel, comprising:
   a sensor base including a plurality of first electrodes, a plurality of second electrodes, and a transparent dielectric layer positioned between the first and second electrodes,
   wherein the sensor base includes the touch sensor substrate of claim 2, and the first electrodes and/or the second electrodes are the electrodes of the touch sensor substrate.

7. A touch panel, comprising:
   a sensor base including a plurality of first electrodes, a plurality of second electrodes, and a transparent dielectric layer positioned between the first and second electrodes,
   wherein the sensor base includes the touch sensor substrate of claim 3, and the first electrodes and/or the second electrodes are the electrodes of the touch sensor substrate.

8. The touch panel of claim 5, wherein the sensor base further includes a cover layer forming an operation surface of the sensor base.

9. The touch panel of claim 8, further comprising:
   a peripheral circuit that measures capacitance between the first and second electrodes.

10. The touch panel of claim 6, wherein the sensor base further includes a cover layer forming an operation surface of the sensor base.

11. The touch panel of claim 10, further comprising:
    a peripheral circuit that measures capacitance between the first and second electrodes.

12. The touch panel of claim 7, wherein the sensor base further includes a cover layer forming an operation surface of the sensor base.

13. The touch panel of claim 12, further comprising:
    a peripheral circuit that measures capacitance between the first and second electrodes.

14. A display device, comprising:
    a display panel that displays information;
    the touch panel of claim 9; and
    a driving circuit that drives the touch panel.

15. A display device, comprising:
    a display panel that displays information;
    the touch panel of claim 11; and
    a driving circuit that drives the touch panel.

16. A display device, comprising:
    a display panel that displays information;
    the touch panel of claim 13; and
    a driving circuit that drives the touch panel.

17. A method of producing a touch sensor substrate, comprising:
    forming a plurality of electrode patterns on a first surface of a base material such that each of the electrodes has a bottom surface positioned on the first surface, a top surface opposite to the bottom surface, and side surfaces connecting the bottom and top surfaces; and applying a blackening treatment to each of the electrode patterns such that a blackened layer is formed on the side surfaces and at least one of the top and bottom surfaces, wherein the blackening treatment is one of a black sulfide treatment and a black substitution treatment.

18. The method of claim 17, wherein the blackening treatment is a black substitution treatment which immerses the electrode patterns in a blackening treatment solution at a temperature of 55° C. or less for 120 seconds or less, and forms the blackened layer having a thickness of 0.2 µm or less on the electrode patterns by a substitution reaction between a metal in the electrode patterns and a Pd ion in the blackening treatment solution.

19. The method of claim 18, wherein the black substitution treatment immerses the electrode patterns for 10 to 120 seconds in the blackening treatment solution having a temperature of from 35° C. to 5.5° C. and a pH of from 1.5 to 2.5, and including the Pd ion at a concentration of from 100 ppm to 500 ppm.

20. The method of claim 19, wherein the black substitution treatment immerses the electrode patterns for a period of time adjusted such that a change in wire width of the electrode patterns before and after the black substitution treatment is 0.3 µm or less.

21. The touch sensor substrate of claim 1, wherein the blackened layer comprises an element selected from the group consisting of Pd, Hg, Ag, Ir, Pt and Au.

22. The touch sensor substrate of claim 1, wherein the blackened layer comprises Pd.

23. The method of claim 17, wherein the blackening treatment is a black substitution treatment comprising a substitution reaction between a metal in the electrode patterns and an ion of an element selected from the group consisting of Pd, Hg, Ag, Ir, Pt and Au.

24. The method of claim 17, wherein the blackening treatment is a black substitution treatment comprising a substitution reaction between a metal in the electrode pattern and a Pd ion.

* * * * *